United States Patent
Walke et al.

(10) Patent No.: US 11,059,573 B2
(45) Date of Patent: *Jul. 13, 2021

(54) POWERLESS SELF OPERATED UPLOCK SYSTEMS AND METHODS

(71) Applicant: GOODRICH AEROSPACE SERVICES PRIVATE LIMITED, Bengaluru (IN)

(72) Inventors: Nilesh R. Walke, Kalyan West (IN); Amar Patel, Bangalore (IN); William E. Luce, Colleyville, TX (US)

(73) Assignee: Goodrich Aerospace Services Private Limited, Karnataka (IN)

(*) Notice: Subject to any disclaimer, the term of this patent is extended or adjusted under 35 U.S.C. 154(b) by 276 days.

This patent is subject to a terminal disclaimer.

(21) Appl. No.: 16/377,002

(22) Filed: Apr. 5, 2019

(65) Prior Publication Data
US 2019/0233092 A1    Aug. 1, 2019

Related U.S. Application Data

(62) Division of application No. 16/143,731, filed on Sep. 27, 2018, now Pat. No. 10,293,921, which is a division of application No. 14/879,841, filed on Oct. 9, 2015, now Pat. No. 10,124,884.

(51) Int. Cl.
| | | |
|---|---|---|
| *B64C 25/26* | (2006.01) | |
| *E05C 19/02* | (2006.01) | |
| *F16H 25/14* | (2006.01) | |

(52) U.S. Cl.
CPC ............ *B64C 25/26* (2013.01); *E05C 19/022* (2013.01); *F16H 25/14* (2013.01)

(58) Field of Classification Search
CPC ............................... B64C 25/26; E05C 19/022
USPC ................................................... 244/102 SL
See application file for complete search history.

(56) References Cited

U.S. PATENT DOCUMENTS

| | | | |
|---|---|---|---|
| 2,423,501 | A | 7/1947 | Johnson |
| 2,567,114 | A | 9/1951 | Linn |
| 2,720,369 | A | 10/1955 | Detzer |
| 3,504,406 | A | 4/1970 | Schott |

(Continued)

FOREIGN PATENT DOCUMENTS

| | | |
|---|---|---|
| DE | 911925 | 5/1954 |
| EP | 0555123 | 8/1993 |

OTHER PUBLICATIONS

European Patent Office, European Search Report dated Apr. 18, 2019 in Application No. 16193122.5.

(Continued)

*Primary Examiner* — Christopher P Ellis
(74) *Attorney, Agent, or Firm* — Snell & Wilmer L.L.P.

(57) ABSTRACT

A method of operating an uplocking system includes contacting with a latchable member a first surface of an opening of a hook biased in a first rotational direction relative to a body, rotating the hook in a second rotational direction with the contacting, moving the hook out of a first position relative to the body, rotating the hook in the first rotational direction after release of the contacting with the latchable member, moving the hook into a second position relative to the body, the first position and the second position being stable when the hook is biased in the first rotational direction without contact being made against the first surface, and retaining the latchable member with a second surface of the hook when the hook is in the second position.

2 Claims, 14 Drawing Sheets

(56) References Cited

U.S. PATENT DOCUMENTS

| | | | |
|---|---|---|---|
| 5,288,037 | A | 2/1994 | Derrien |
| 5,855,496 | A | 1/1999 | Lokken |
| 6,027,070 | A | 2/2000 | Zambelli |
| 6,802,476 | B2 | 10/2004 | Collet |
| 7,261,338 | B2 | 8/2007 | Spurr |
| 7,360,803 | B2 | 4/2008 | Parent |
| 7,883,125 | B2 | 2/2011 | Smith, III |
| 7,959,195 | B2 | 6/2011 | Harvey |
| 8,109,465 | B1 | 2/2012 | Heer |
| 8,272,285 | B2 | 9/2012 | Kearns |
| 8,814,094 | B2 | 8/2014 | Tran |
| 9,102,403 | B2 | 8/2015 | Rogulski |
| 9,212,505 | B2 | 12/2015 | Geng |
| 2003/0164421 | A1 | 9/2003 | Collet |
| 2003/0164422 | A1 | 9/2003 | Collet |
| 2006/0163426 | A1 | 7/2006 | Smith, III |
| 2009/0284025 | A1 | 5/2009 | Salcombe |
| 2011/0056197 | A1 | 3/2011 | Schmidt |
| 2013/0119197 | A1 | 5/2013 | Ducos |
| 2015/0203192 | A1 | 7/2015 | Slanker |
| 2016/0137295 | A1 | 5/2016 | Bond |

OTHER PUBLICATIONS

Extended European Search Report dated May 11, 2017 in European Application No. 16193122.5.
USPTO: Notice of Allowance issued in U.S. Appl. No. 14/879,841 dated Jul. 27, 2018.
USPTO: Notice of Allowance issued in U.S. Appl. No. 16/143,731 dated Jan. 17, 2019.
European Patent Office, European Office Action dated Mar. 13, 2020 in Application No. 16193122.5.

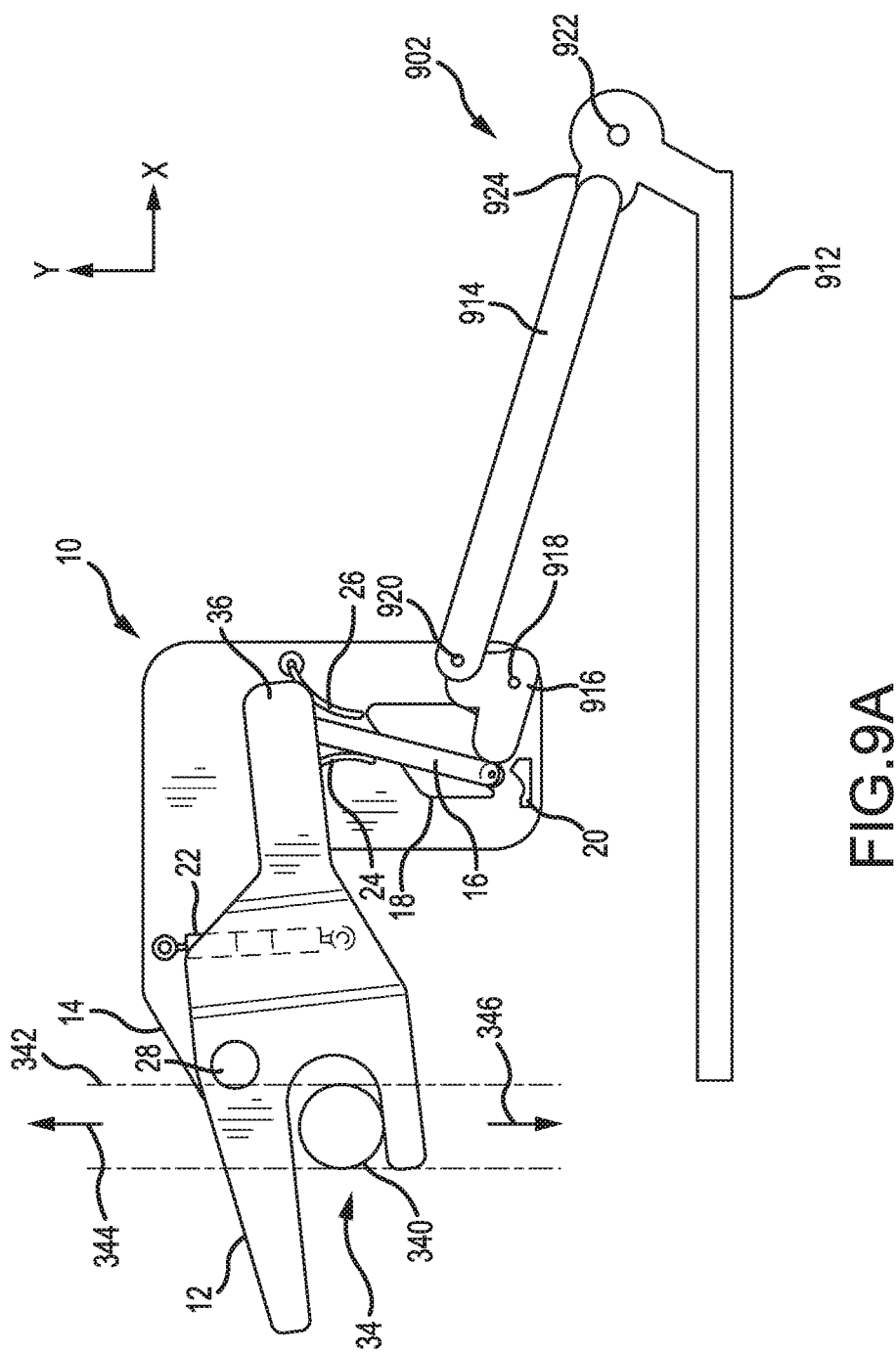

POWERLESS SELF OPERATED UPLOCK SYSTEMS AND METHODS

CROSS REFERENCE TO RELATED APPLICATIONS

This application is a divisional of, and claims priority to, and the benefit of U.S. Ser. No. 16/143,731 filed on Sep. 27, 2018, and entitled "POWERLESS SELF OPERATED LANDING GEAR UPLOCK SYSTEM" which is a divisional of U.S. Ser. No. 14/879,841 filed on Oct. 9, 2015, U.S. Pat. No. 10,124,884, both of which are incorporated by reference herein in their entirety.

FIELD

The present disclosure relates to aircraft landing gear, and, more specifically, to a system and method for locking landing gear in a stowed position.

BACKGROUND

Aircraft uplock mechanisms are designed to lock landing gear in a stowed position and assist in carrying the weight of the landing gear during flight. Conventional uplock mechanisms comprise spring loaded catch systems and hydraulic systems to release the locking mechanism. Hydraulic actuation systems can be complex in functionality and design.

SUMMARY

An uplock system is disclosed herein, in accordance with various embodiments. An uplock system may comprise a body, a hook having an opening defining at least a first surface and a second surface, the hook being rotationally engaged with the body, a first biasing member configured to bias the hook in a first rotational direction relative to the body, and a cam in operable communication with the hook and the body such that the hook has at least a first stable position and a second stable position relative to the body when biased in the first rotational direction, the hook being movable between the first position and the second position in response to being momentarily moved in a second rotational direction via contact with a member against the first surface with force greater than that provided by the first biasing member, the member being retained by the second surface when the hook is in the second position and being releasable from the hook when the hook is in the first position.

In various embodiments, the uplock system may further comprise a second biasing member and a third biasing member, wherein the second biasing member is coupled to an outer surface of the body and the third biasing member is coupled to the outer surface of the body. The uplock system may further comprise a following member coupled to the hook via a second pin, the following member configured to rotate about the second pin. A second biasing member may be configured to bias a rotation of a following member in the first rotational direction, wherein the second biasing member may be preloaded by the following member in response to the hook moving from the first stable position to the second stable position and the following member may engage a stopping member in response to the following member clearing the cam, the stopping member coupled to the body. A following member may engage a concave surface of the cam in response to the member moving in a fourth direction and the first biasing member rotating the hook in the first rotational direction. In response to the member moving in a third direction, a second biasing member may rotate a following member in the first rotational direction. In response to the hook moving from the second stable position to the first stable position, a following member may be configured to engage the cam in response to the member moving in a fourth direction and the first biasing member may be configured to rotate the hook in the first rotational direction, the following member configured to rotate in the first rotational direction in response to the engaging, wherein a third biasing member may be preloaded in response to the rotating of the following member. In response to the hook moving from the second stable position to the first stable position, a third biasing member may rotate a following member in the second rotational direction in response to the following member clearing the cam. The first biasing member may be coupled between the body and the hook. The following member may include a roller, the roller configured to engage the cam. The uplock system may further comprise a manual release system, the manual release system including a cable coupled to the hook, wherein the cable is configured to rotate the hook in the second rotational direction to begin an unlocking process. The uplock system may further comprise a manual release system, the manual release system comprising an actuator coupled to the uplock system, the actuator configured to rotate a following member in the first rotational direction to begin an unlocking process. The uplock system may be coupled to a safety blocking mechanism, the safety blocking mechanism configured to prevent the hook from rotating in the second rotational direction in response to contact with the latchable member against the first surface with force greater than that provided by the first biasing member. The uplock system may be coupled to a safety blocking mechanism, the safety blocking mechanism configured to prevent the hook from moving to the first stable position.

A landing gear uplock system may comprise a cam coupled to a center body, a stopper coupled to the center body, a hook coupled to the center body via a first pin, the hook configured to rotate about the first pin, a spring coupled between the center body and the hook, wherein the spring may be configured to bias the hook in a first rotational direction, a follower coupled to the hook via a second pin, the follower configured to rotate about the second pin, a second spring housed at least partially within the center body, wherein the second spring may be configured to bias a rotation of the follower in the first rotational direction, and a third spring housed at least partially within the center body, wherein the third spring may be configured to bias the rotation of the follower in a second rotational direction.

In various embodiments, the landing gear uplock system may be configured to begin at least one of a locking process and an unlocking process in response to a landing gear roller moving in a third direction and rotating the hook in the second rotational direction against the bias of the spring. The landing gear uplock system may be coupled to a housing, wherein the housing may be configured to at least partially enclose the landing gear uplock system. The hook may comprise a hook opening, the hook opening configured to receive a landing gear roller.

A method of operating an uplocking system may comprise contacting with a member a first surface of an opening of a hook biased in a first rotational direction relative to a body, rotating the hook in a second rotational direction with the contacting, moving the hook out of a first position relative to the body, rotating the hook in the first rotational direction after release of the contacting with the member, moving the hook into a second position relative to the body, the first position and the second position being stable when the hook is biased in the first rotational direction without contact being made against the first surface, and retaining the member with a second surface of the hook when the hook is in the second position.

In various embodiments, the hook may be retained in the second position via a following member engaged with a cam.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 9A illustrates an uplock system coupled to a safety blocking mechanism with the door closed, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In various embodiments, a landing gear uplock system may be a passive system. A passive landing gear uplock system may provide a lightweight and simple system which may decrease overall part count as well as decrease overall weight of a landing gear assembly. A first biasing member illustrated herein as a spring may be used to bias a hook in a counter-clockwise (or first) direction. A follower or following member may be coupled to the hook. A second and third biasing members illustrated herein as springs may be used to bias a direction of rotation of the follower.

Figure 1A:
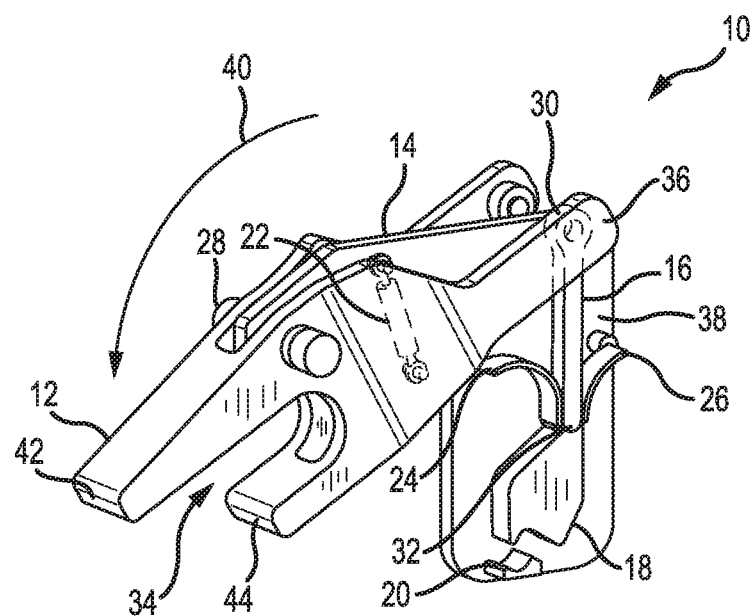
FIG. 1A illustrates a perspective view of a first side of a landing gear uplock system, in accordance with various embodiments.
Figure 1B:
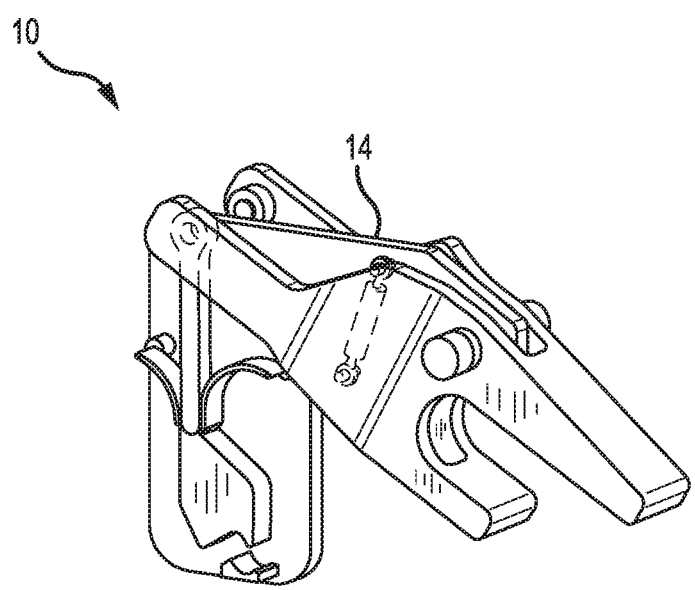
FIG. 1B illustrates a perspective view of a second side of a landing gear uplock system, in accordance with various embodiments.

A landing gear uplock system may comprise a center body wherein the landing gear uplock system is mirrored about the center body according to various embodiments and as illustrated in FIG. 1A and FIG. 1B. Although in various portions of the present specification the landing gear uplock system may be described relative to only one side of the center body, the landing gear uplock system may comprise an equal and opposite side which includes the same features as the side described, as shown herein. For example, in various portions of the present specification, although the landing gear uplock system is described herein as having a single follower coupled to the hook, there may be a second follower on the opposite side of the center body which is also coupled to the hook and which may operate in a similar manner as the first follower.

With reference to FIG. 1A, a powerless self-operated uplock system 10 (hereinafter referred to as uplock system 10) is illustrated. In various embodiments, uplock system 10 may be used in the landing gear of an aircraft. Uplock system 10 may include a hook 12, a center body 14, a following member (also referred to herein as follower) 16, a cam 18, a stopping member (also referred to herein as a stopper) 20, a first biasing member (also referred to herein as first spring) 22, a second biasing member (also referred to herein as second spring) 24, and a third biasing member (also referred to herein as third spring) 26. In various embodiments, first biasing member 22 may comprise a coil spring, elastic band, leaf spring, or any other forms of a compressive spring. In various embodiments, second biasing member 24 and third biasing member 26 may each individually comprise a leaf spring. In various embodiments, second biasing member 24 and third biasing member 26 may be coupled to an outer surface 38 of center body 14.

In various embodiments, the hook 12 may comprise a first prong 42, a second prong 44, and hook arm 36. In various embodiments, hook opening 34 may be located between first prong 42 and second prong 44. Hook arm 36 may extend away from hook opening 34. Hook opening 34 may be defined by first prong 42 and second prong 44. In various embodiments, hook opening 34 may comprise an aperture. In various embodiments, hook 12 may comprise a fork structure as shown by first prong 42 and second prong 44, in accordance with various embodiments.

Hook 12 may be coupled to center body 14 via first pin 28 (also referred to herein as a first pivot). Hook 12 may be configured to pivot about first pin 28. Thus, hook 12 may be rotationally engaged with center body 14. Follower 16 may be coupled to hook arm 36 via second pin 30 (also referred to herein as a second pivot). Follower 16 may be configured to pivot about second pin 30. Follower 16 may include roller 32. Roller 32 may be located on the opposite side of follower 16 as second pin 30. First biasing member 22 may be coupled between center body 14 and hook 12. The first biasing member 22 may bias the hook 12 to rotate about the first pin 28 in the counter-clockwise direction as viewed in FIG. 3A, for example (also referred to herein as a first rotational direction), as illustrated by arrow 40.

With respect to FIGS. 1B-8B, elements with like element numbering as depicted in FIG. 1A are intended to be the same and will not necessarily be repeated for the sake of clarity.

With respect to FIG. 1B, a perspective view of the opposite side of uplock system 10, with respect to FIG. 1A, is illustrated. As previously mentioned uplock system 10 may be mirrored about center body 14 according to various embodiments.

Figure 2:
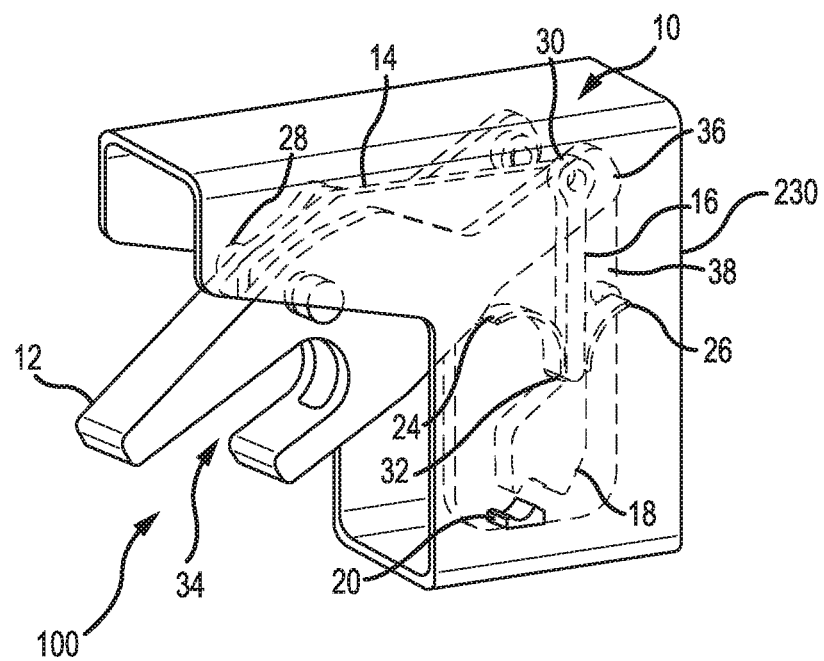
FIG. 2 illustrates a perspective view of a landing gear uplock system comprising a housing, in accordance with various embodiments.

With reference to FIG. 2, uplock system 10 is illustrated, in accordance with various embodiments. In various embodiments, uplock system 10 may comprise a housing 230. Housing 230 may at least partially enclose uplock system 10.

Figure 3A:
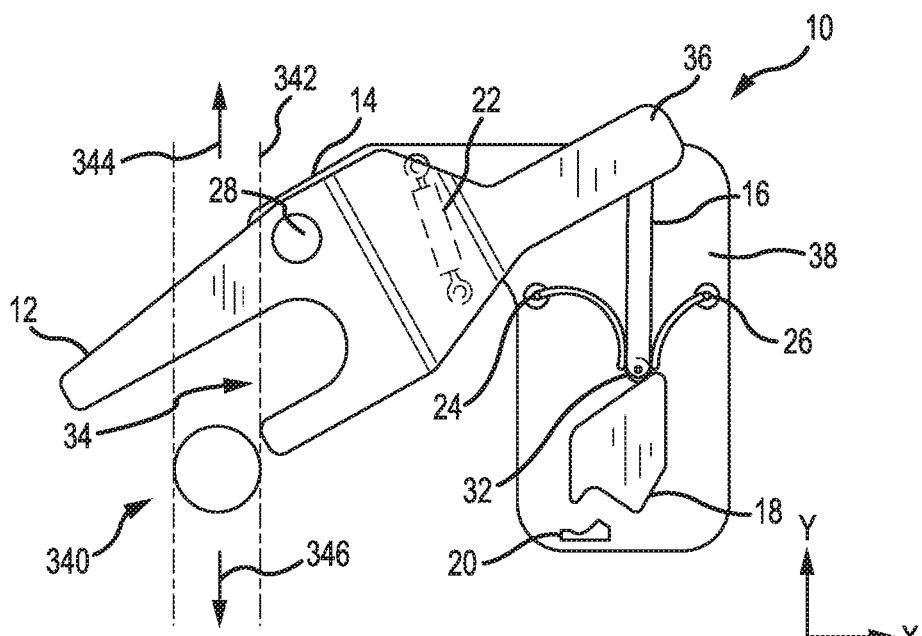
FIG. 3A illustrates a schematic view of a landing gear uplock system in an unlocked position, in accordance with various embodiments.

With reference to FIG. 3A, a schematic view of uplock system 10 in an unlocked position (also referred to herein as a first stable position) is illustrated, in accordance with various embodiments. In various embodiments, hook opening 34 may be configured to receive a latchable member (also referred to herein as a landing gear roller) 340. Landing gear roller 340 may be located outside of hook opening 34 when uplock system 10 is in an unlocked position as illustrated in FIG. 3A. Landing gear roller 340 may be coupled to an aircraft landing gear. Landing gear roller 340 may be configured to engage hook 12 to lock landing gear roller 340 in a stowed position. In various embodiments, landing gear roller 340 may be configured to move in the y-direction as illustrated by roller movement window 342. Roller movement window 342 illustrates the path by which landing gear roller 340 travels. Accordingly, landing gear roller 340 may be configured to move in the direction as illustrated by second arrow 346 (negative y-direction) and may be configured to move in the direction as illustrated by first arrow 344 (positive y-direction). The direction as illustrated by first arrow 344 may be referred to herein as a third direction. The direction as illustrated by second arrow 346 may be referred to herein as a fourth direction.

With respect to FIGS. 3B-9B, elements with like element numbering as depicted in FIG. 3A are intended to be the same and will not necessarily be repeated for the sake of clarity.

Figure 11:
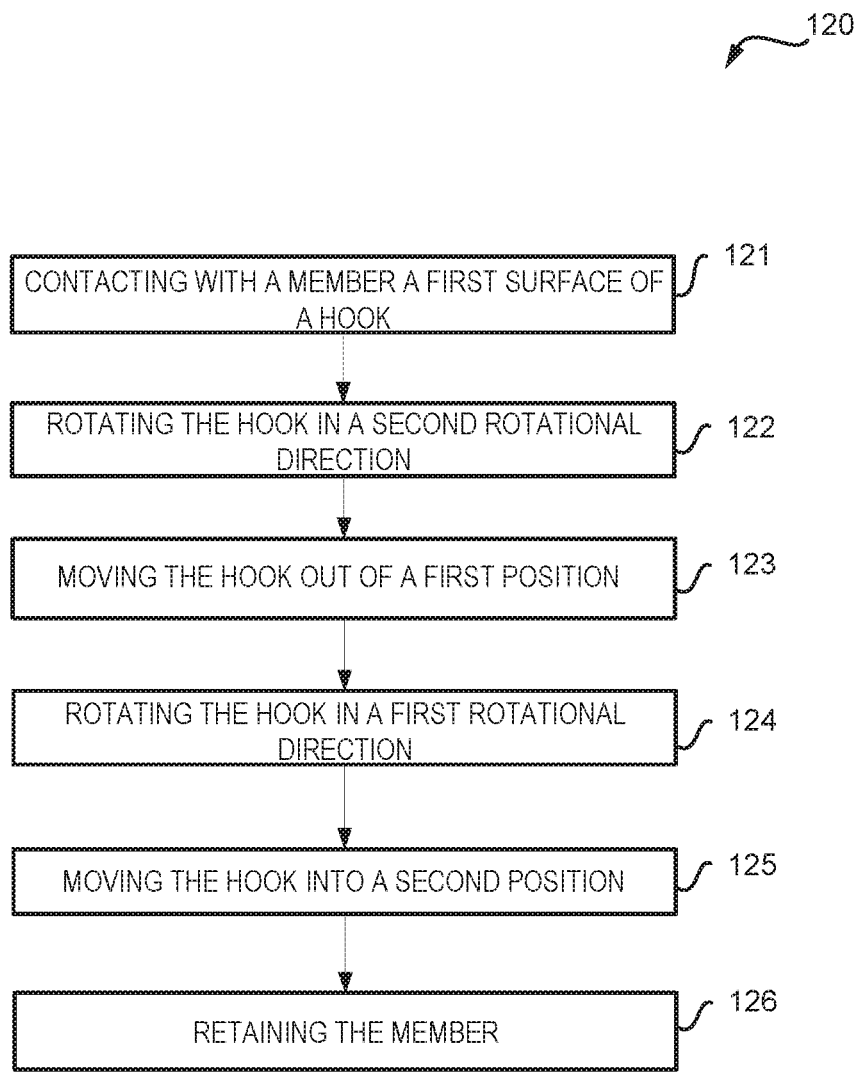
FIG. 11 provides a method for locking an uplock system, in accordance with various embodiments.

With reference to FIG. 11, a method 120 for operating an uplock system 10 is provided, in accordance with various embodiments.

Figure 3B:
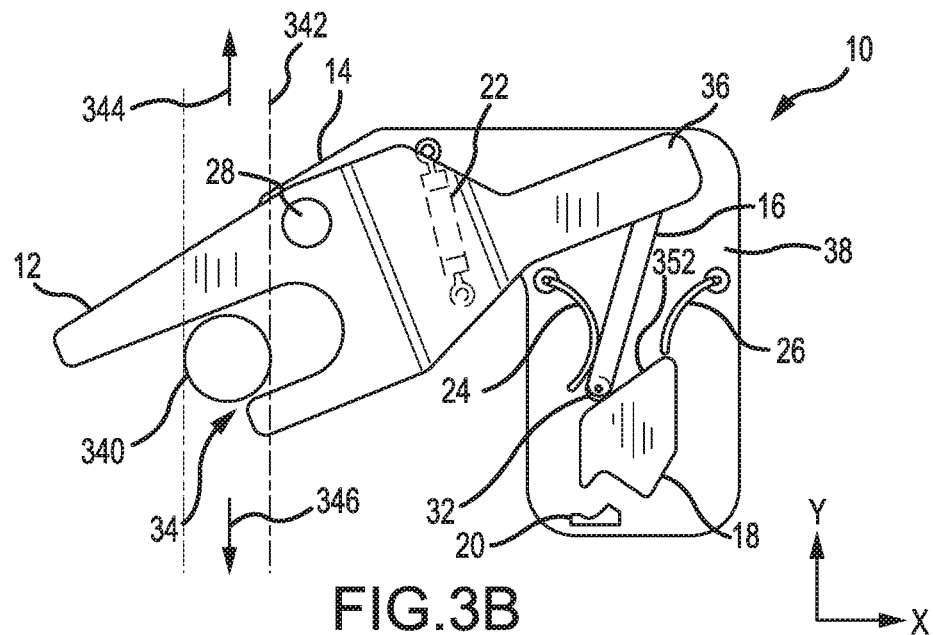
FIG. 3B illustrates a locking process of a landing gear uplock system, in accordance with various embodiments.

With further reference to FIG. 3B, when a landing gear is retracted from a deployed position to a stowed position, landing gear roller 340 may move in the direction as illustrated by first arrow 344 (positive y-direction) and engage first surface 360 of hook 12 to begin the locking process of uplock system 10 (see step 121 in FIG. 11). The engagement may cause hook 12 to rotate about first pin 28 in a clockwise direction as viewed in FIG. 3A, for example, (also referred to herein as a second rotational direction) (see step 122 in FIG. 11). The rotation of hook 12 about first pin 28 in the clockwise direction may drive follower 16 in the negative y-direction causing roller 32 to engage or otherwise interact with first angled surface 352 of cam 18. Thus, hook 12 may be moved out of its unlocked or first stable position (see step 123 in FIG. 11). The interaction of roller 32 and cam 18 may cause follower 16 to rotate about second pin 30 (see FIG. 1A) in the clockwise-direction which may cause follower 16 to preload second biasing member 24. Accordingly, second biasing member 24 may bias follower 16 to rotate about second pin 30 (see FIG. 1A) in the counter-clockwise direction. In various embodiments, the bias of first biasing member 22 may be greater than the bias of second biasing member 24 and greater than third biasing member 26.

Figure 3C:
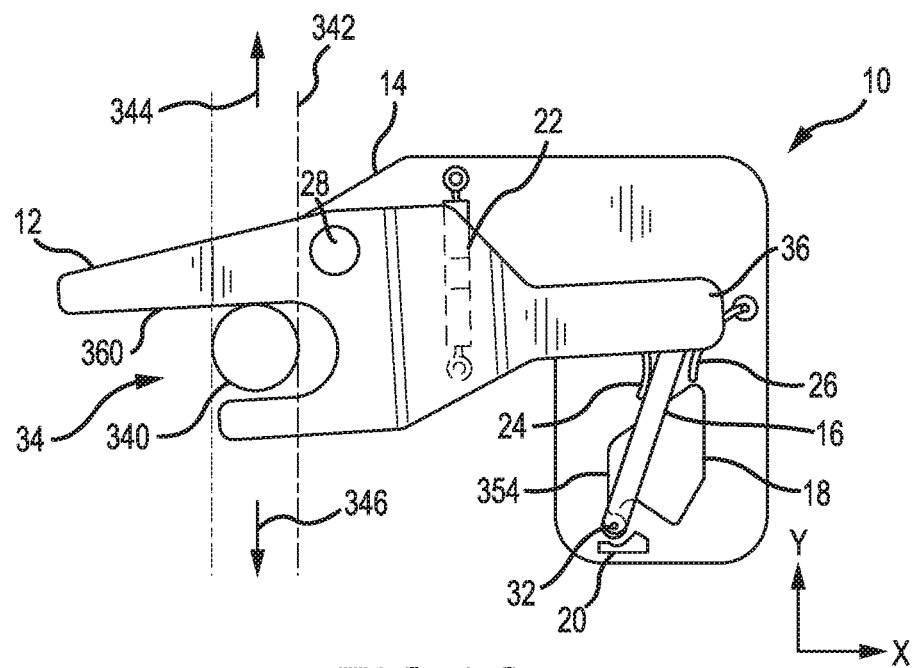
FIG. 3C illustrates a locking process of a landing gear uplock system, in accordance with various embodiments.
Figure 3D:
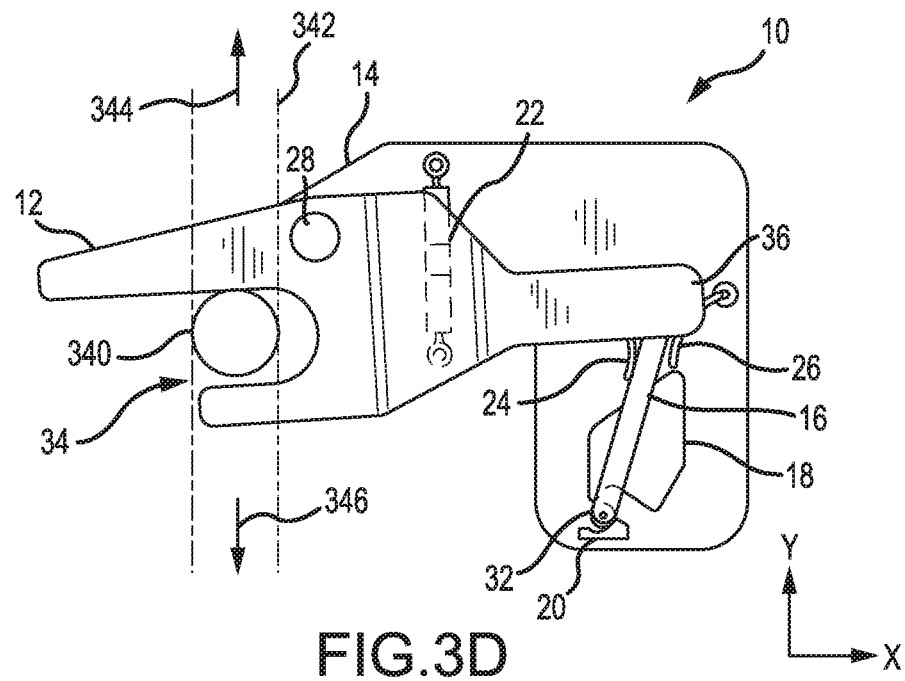
FIG. 3D illustrates a locking process of a landing gear uplock system, in accordance with various embodiments.
Figure 3E:
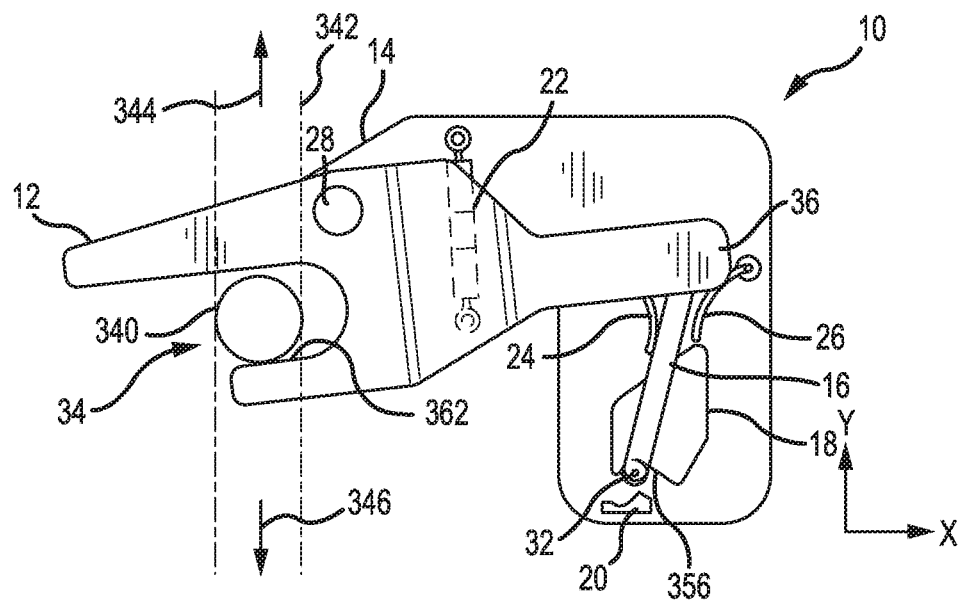
FIG. 3E illustrates a schematic view of a landing gear uplock system in a locked position, in accordance with various embodiments.

With further reference to FIG. 3C, as landing gear roller 340 continues to engage hook 12 (moving in the positive y-direction), hook 12 may continue to rotate about first pin 28 in the clockwise direction. Roller 32 may follow the outer surface 354 of cam 18 in the negative y-direction until roller 32 is no longer in contact with cam 18, at which point second biasing member 24 may bias follower 16 to begin to rotate about second pin 30 (see FIG. 1A) in the counter-clockwise direction. With further reference to FIG. 3D, follower 16 may continue to rotate about second pin 30 (see FIG. 1A) in the counter-clockwise direction until roller 32 strikes (or is stopped by) stopper 20 as illustrated in FIG. 3D. At this time, with reference to FIG. 3E, landing gear roller 340 may move in the direction as illustrated by second arrow 346 (negative y-direction). This movement of landing gear roller 340 may allow the bias of first biasing member 22 to rotate hook 12 about first pin 28 in the counter-clockwise direction (see step 124 in FIG. 11). The rotation of hook 12 may drive follower 16 in the positive y-direction, causing roller 32 to lock into the concave surface 356 of cam 18 and thus move hook 12 into a locked or second stable position (see step 125 in FIG. 11). FIG. 3E illustrates uplock system 10 in a locked position (also referred to herein as a second stable position), in accordance with various embodiments. Landing gear roller 340 may be retained, or prevented from moving in the negative y-direction, by the second surface 362 of hook 12 when hook 12 is in the locked position (see step 126 in FIG. 11).

Figure 3F:
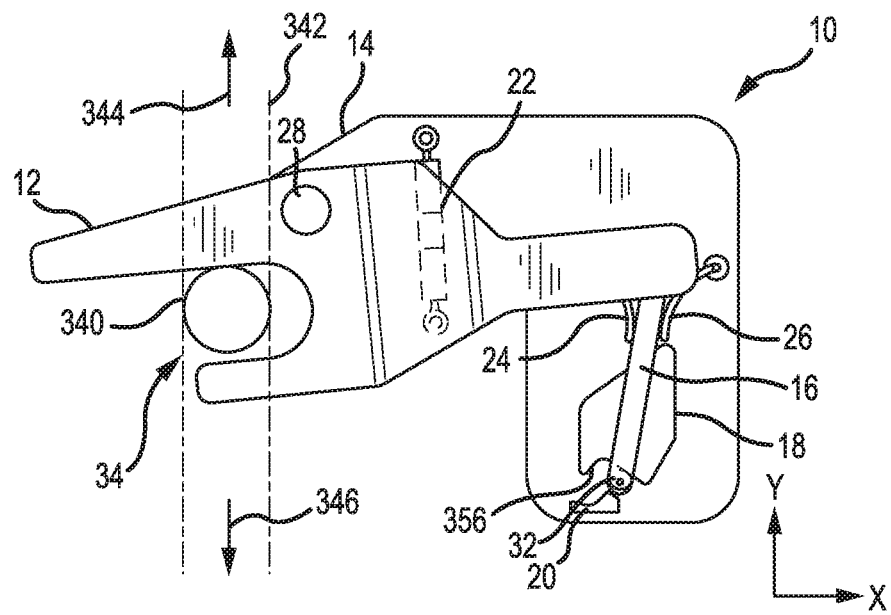
FIG. 3F illustrates an unlocking process of a landing gear uplock system, in accordance with various embodiments.
Figure 3G:
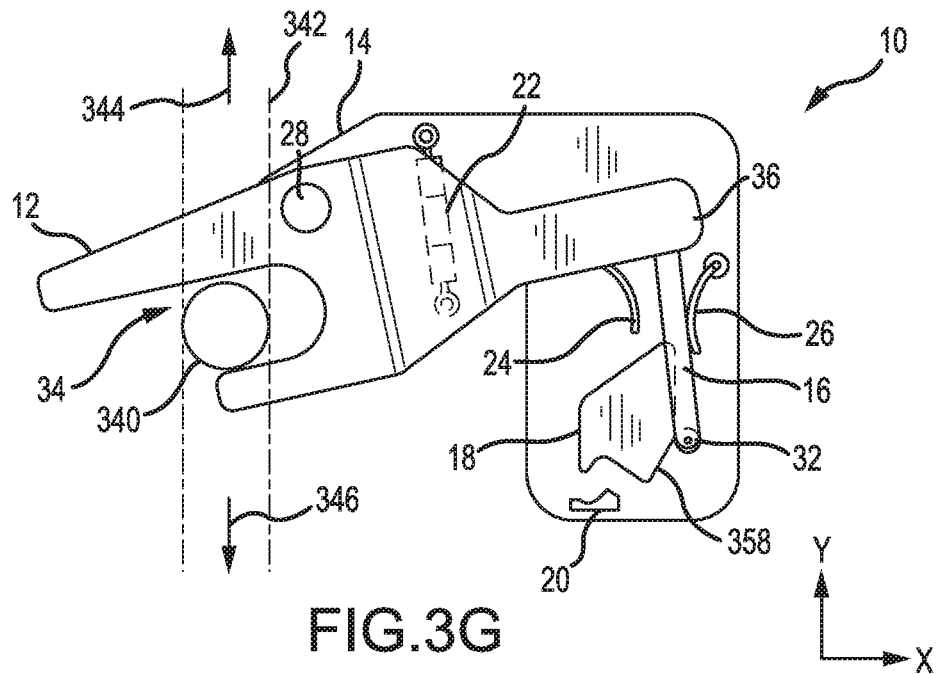
FIG. 3G illustrates an unlocking process of a landing gear uplock system, in accordance with various embodiments.

With further reference to FIG. 3F, to begin the unlocking process of uplock system 10, landing gear roller 340 may move in the direction as illustrated by first arrow 344 (positive y-direction) which may cause hook 12 to rotate about first pin 28 in the clockwise direction. This may drive follower 16 in the negative y-direction allowing the bias of second biasing member 24 to rotate follower 16 about second pin 30 (see FIG. 1A) in the counter-clockwise direction until roller 32 of follower 16 has cleared (in the positive x-direction) the concave surface 356 of cam 18. At this point, with further reference to FIG. 3G, landing gear roller 340 may move in the direction as illustrated by second arrow 346 (negative y-direction) which may allow the bias of first biasing member 22 to rotate hook 12 about first pin 28 in the counter-clockwise direction. This may drive follower 16 in the positive y-direction. As follower 16 is driven in the positive y-direction, second angled surface 358 of cam 18 may interact or engage with roller 32 which may cause follower 16 to rotate about second pin 30 (see FIG. 1A) in the counter-clockwise direction which may consequently preload third biasing member 26. At this point, first biasing member 22 may rotate hook 12 about first pin 28 in the counter-clockwise direction until the landing gear roller is free from the hook opening 34 and roller 32 has cleared cam 18 such that third biasing member 26 biases follower 16 to rotate about second pin 30 (see FIG. 1A) in the clockwise direction until follower 16 is back to the unlocked position as illustrated in FIG. 3A.

In various embodiments, cam 18 and/or stopper 20 may be integral with center body 14. Accordingly, cam 18 and/or stopper 20 may comprise a single piece. In various embodiments, cam 18 and/or stopper 20 may be subtractively manufactured. In various embodiments, cam 18 and/or stopper 20 may be manufactured via any suitable method.

In various embodiments, cam 18 and/or stopper 20 may be coupled to center body 14. In various embodiments, cam 18 and/or stopper 20 may be attached to center body 14 via a bolt, weld, or any other suitable method.

Figure 4:
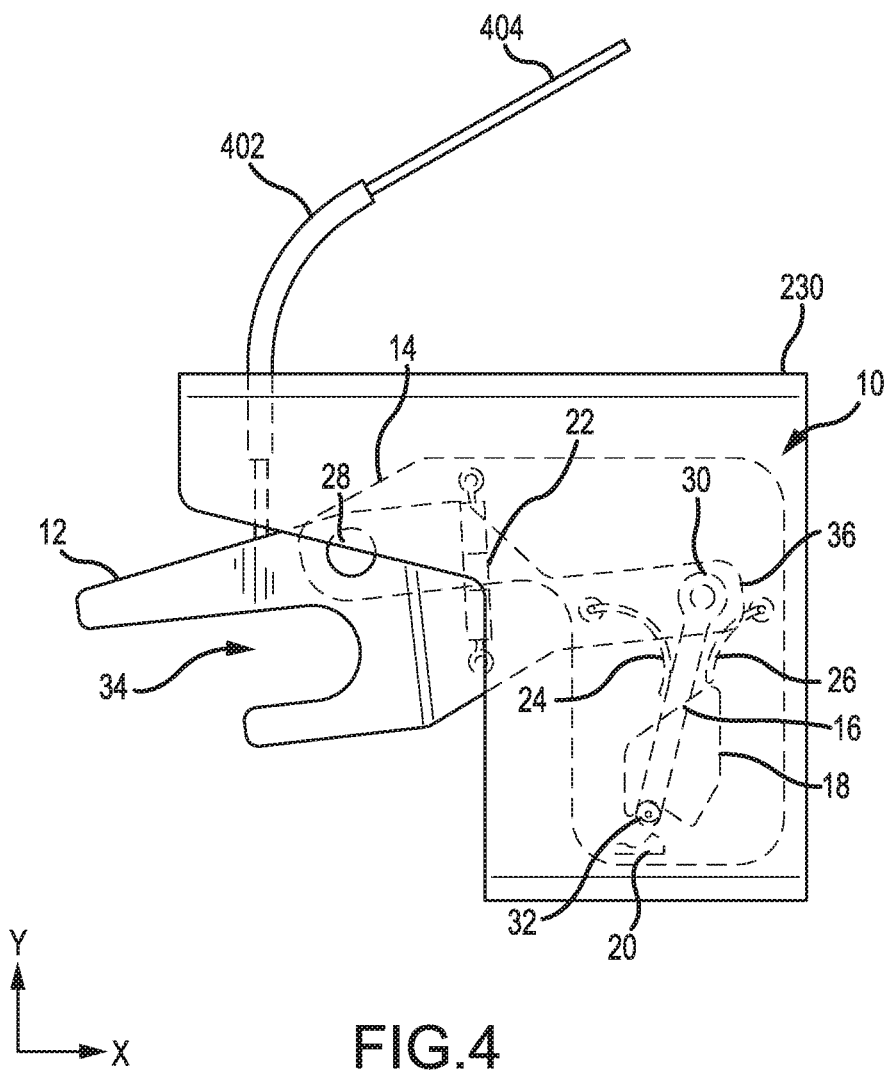
FIG. 4 illustrates a schematic view of a manual release system coupled to an uplock system, in accordance with various embodiments.

With reference to FIG. 4, a manual release system 402 may be coupled to uplock system 10, in accordance with various embodiments. In various embodiments, manual release system 402 may be coupled to uplock system 10 via hook 12. Manual release system 402 may comprise a cable 404 or other mechanical linkage to pull up (in the positive y-direction) on hook 12 to begin the unlocking process of uplock system 10, as described herein.

Figure 5A:
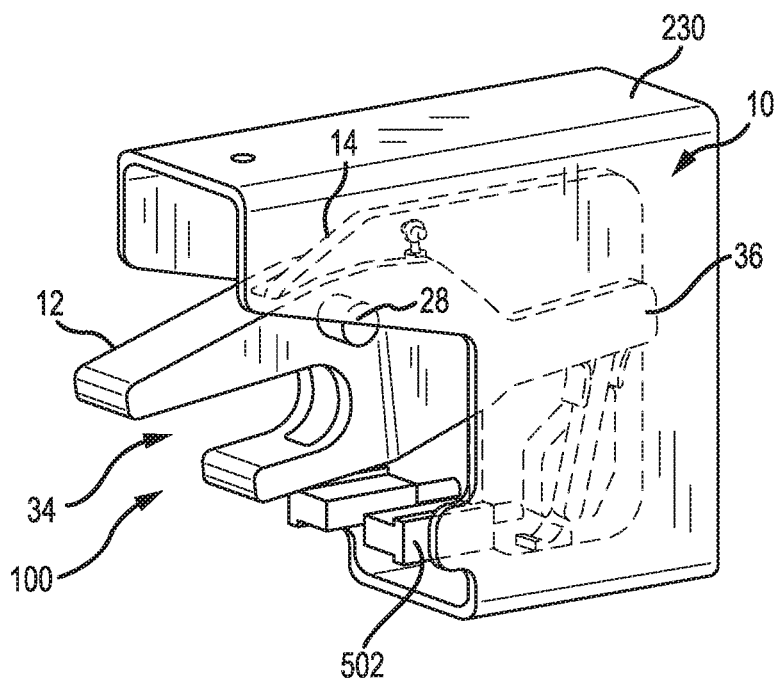
FIG. 5A illustrates a perspective view of a manual release system coupled to an uplock system, in accordance with various embodiments.
Figure 5B:
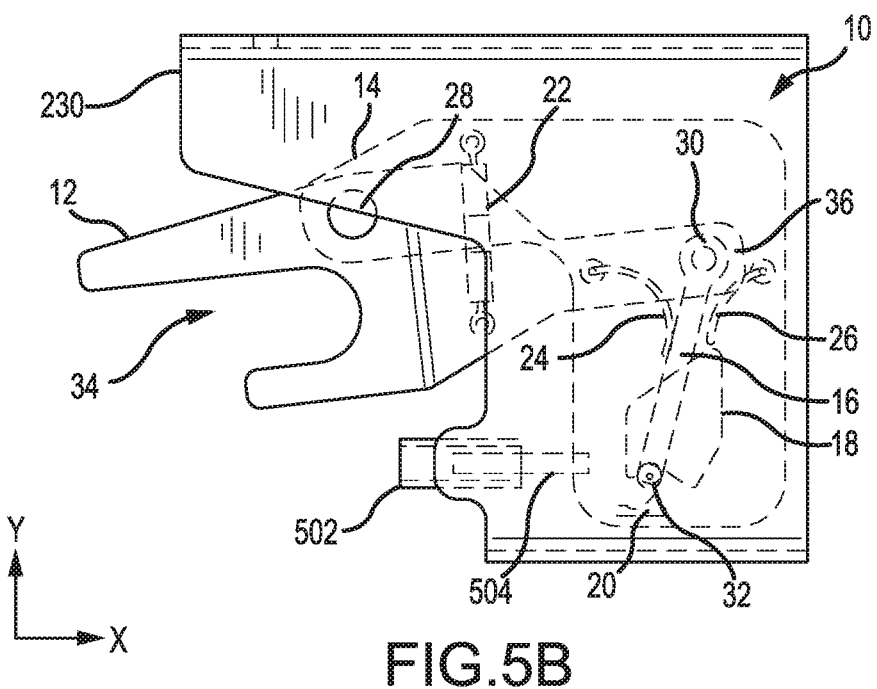
FIG. 5B illustrates a schematic view of a manual release system coupled to an uplock system, in accordance with various embodiments.
Figure 5C:
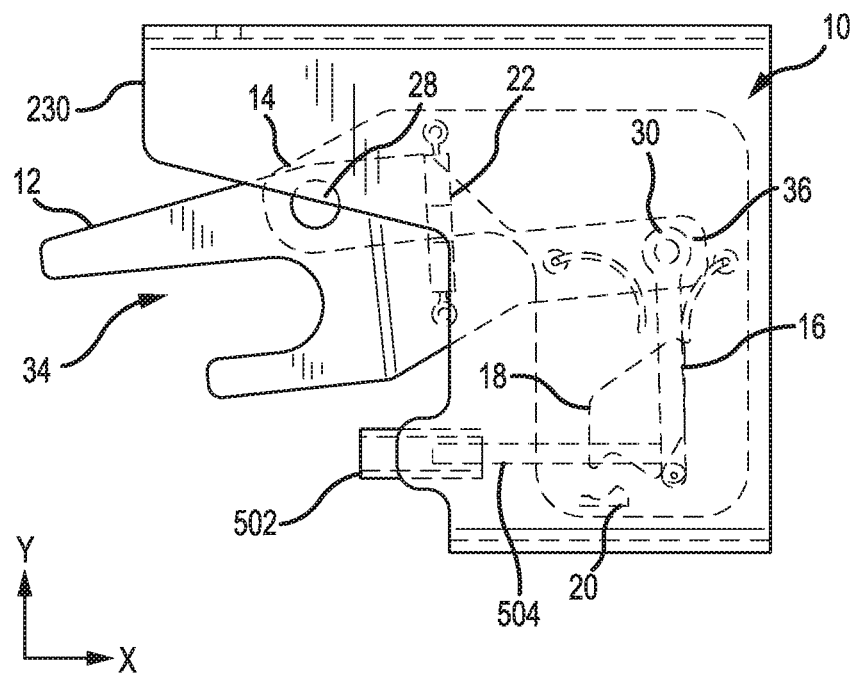
FIG. 5C illustrates a schematic view of a manual release system beginning the unlocking process of an uplock system, in accordance with various embodiments.

With reference to FIG. 5A, a manual release system 502 may be coupled to housing 230, in accordance with various embodiments. In various embodiments, manual release system 502 may comprise an actuator. With reference to FIG. 5B, uplock system 10 is shown in a locked position, in accordance with various embodiments. Manual release system 502 is shown as an actuator with an actuator rod 504 in a contracted position. With reference to FIG. 5C, manual release system 502 is shown as an actuator with an actuator rod 504 in an extended position, in accordance with various embodiments. Actuator rod 504 may extend from manual release system (actuator) 502 in order to rotate follower 16 in the counter-clockwise direction to begin the unlocking process of uplock system 10, as described herein.

Figure 6A:
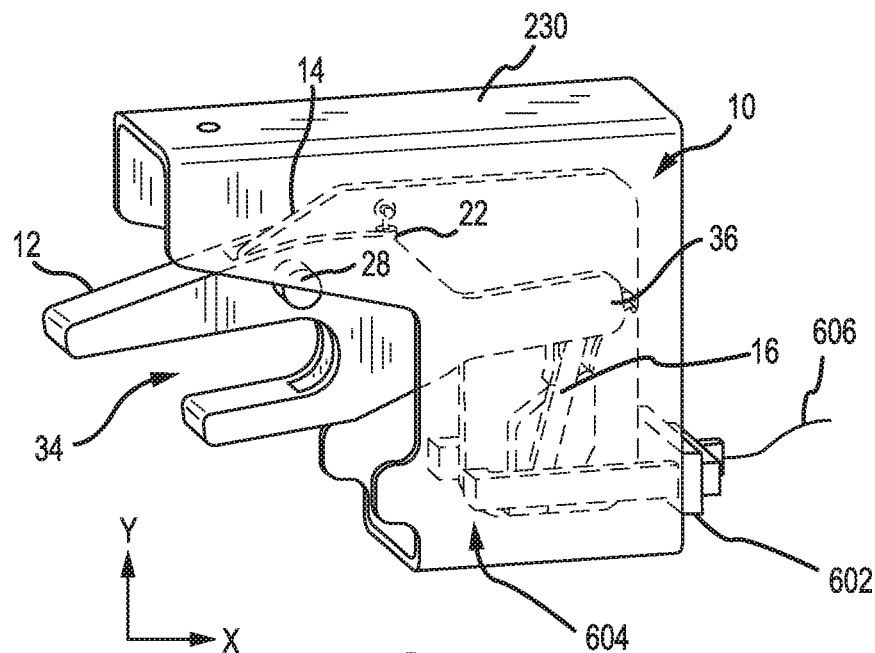
FIG. 6A illustrates a perspective view of a manual release system coupled to an uplock system, in accordance with various embodiments.
Figure 6B:
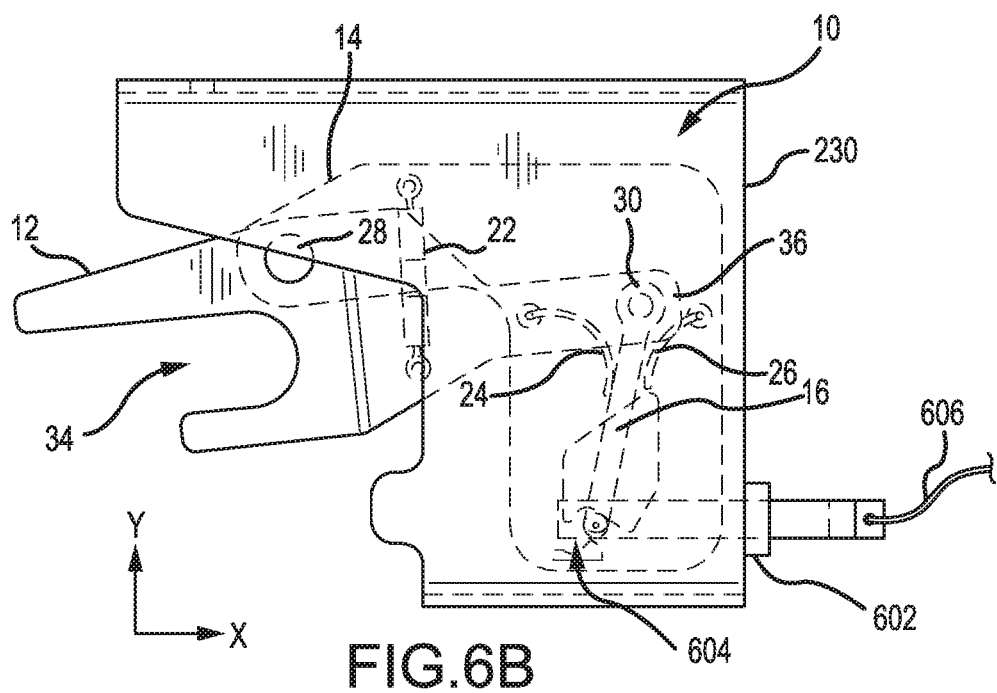
FIG. 6B illustrates a schematic view of a manual release system beginning the unlocking process of an uplock system, in accordance with various embodiments.

With reference to FIG. 6A, a manual release system 602 may be coupled to uplock system 10, in accordance with various embodiments. In various embodiments, manual release system 602 may be coupled to uplock system 10 via follower 16. In various embodiments, manual release system 602 may comprise a cable 606 or other mechanical linkage to pull or rotate follower 16 in the counter-clockwise direction, via yoke 604, to begin the unlocking process of uplock system 10, as described herein. In various embodiments, manual release system 602 may be fixed to housing 230. With reference to FIG. 6B, manual release system 602 is illustrated wherein yoke 604 has been actuated or pulled in the positive x-direction via cable 606 to rotate follower 16 in the counter-clockwise direction, thus having begun the unlocking process, as described herein.

Figure 7:
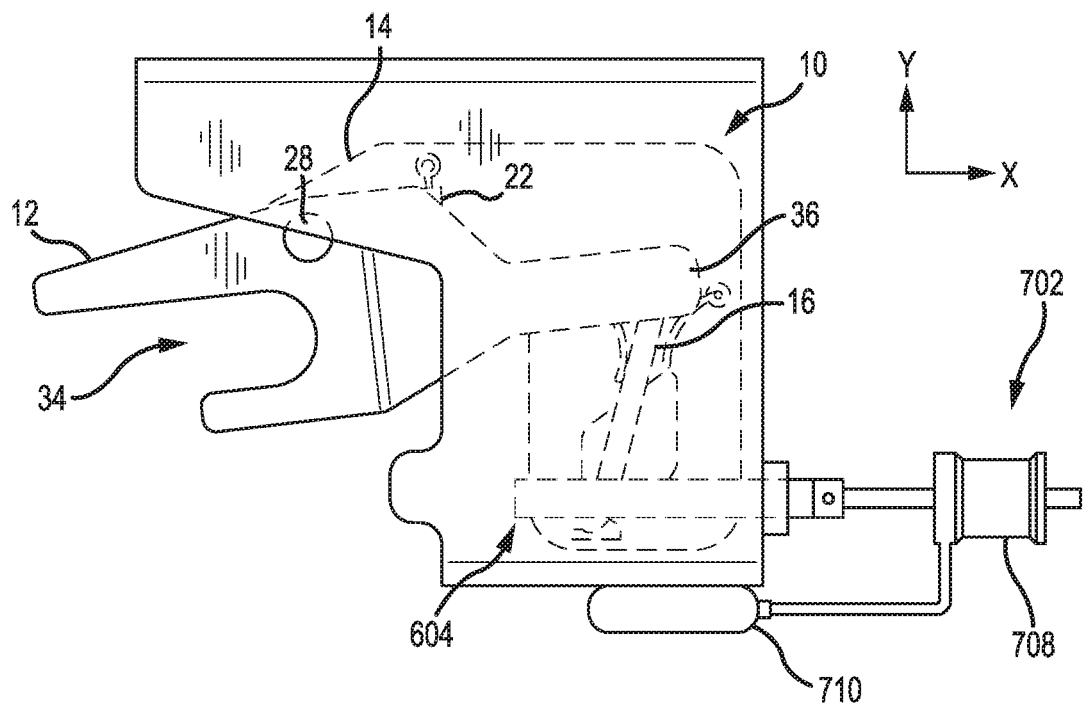
FIG. 7 illustrates a schematic view of a pneumatic manual release system coupled to an uplock system, in accordance with various embodiments.

With respect to FIG. 7, elements with like element numbering as depicted in FIG. 6A and FIG. 6B are intended to be the same and will not necessarily be repeated for the sake of clarity.

With reference to FIG. 7, a manual release system 702 may be coupled to uplock system 10, in accordance with various embodiments. In various embodiments, manual release system 702 may be coupled to uplock system 10 via follower 16. In various embodiments, manual release system 702 may be similar to manual release system 602. In various embodiments, manual release system 702 may comprise a pneumatic system. Manual release system 702 may include a pneumatic actuator 708 coupled to a tank 710 and yoke 604. Pneumatic actuator 708 may be configured to pull yoke 604 in the positive x-direction, in turn, pulling or rotating follower 16 in the counter-clockwise direction to begin the unlocking process of uplock system 10, as described herein. In various embodiments, manual release system 702 may be fixed to housing 230.

With reference to FIG. 5A through FIG. 7, manual release system 502, 602, and 702 may be configured to initiate the unlocking process, as described herein, of uplock system 10 in the case that the landing gear roller 340 (see FIG. 3A) does not initiate the unlocking process by moving in the direction as illustrated by first arrow 344 (see FIG. 3A).

Figures 8A, 8B:
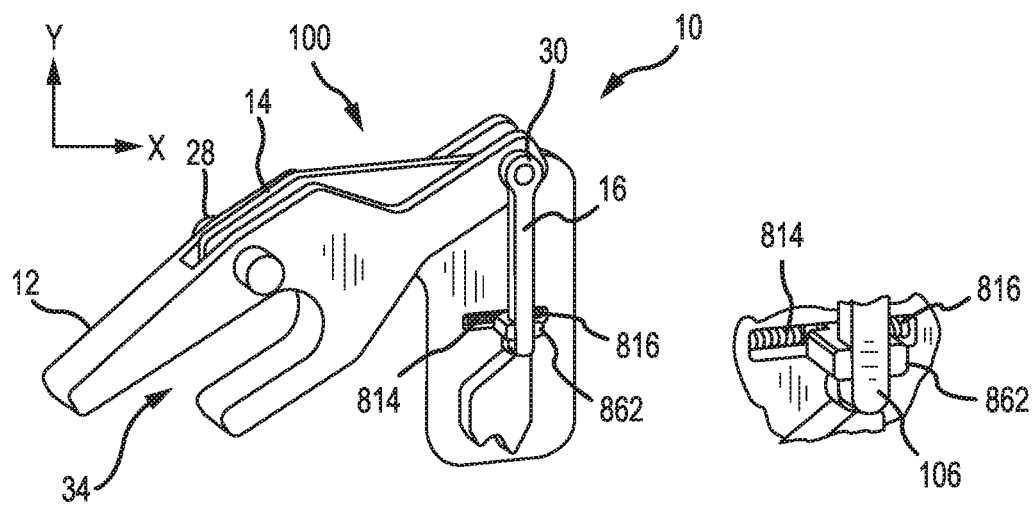
FIG. 8A illustrates an uplock system with a second coil spring and a third coil spring housed within the center body, in accordance with various embodiments.
FIG. 8B illustrates a detailed view of a second coil spring and a third coil spring housed within the center body, in accordance with various embodiments.

With reference to FIG. 8A, an alternate second and third spring assembly is illustrated in accordance with various embodiments. In various embodiments, follower 16 may be coupled to a slider 862. Slider 862 may be configured to freely slide axially over (in the y-direction) follower 16. In various embodiments, as illustrated in detail in FIG. 8B, slider 862 may be coupled between second spring 814 and third spring 816. In various embodiments, second spring 814 may be similar to second biasing member 24 (see FIG. 1A) and third spring 816 may be similar to third biasing member 26 (see FIG. 1A). In various embodiments, second spring 814 and third spring 816 may be housed at least partially within center body 14 as illustrated in FIG. 8A and FIG. 8B. In various embodiments, second spring 814 and third spring 816 may comprise a coil spring. In various embodiments, second spring 814 and third spring 816 may comprise a single spring wherein slider 862 is coupled to a midpoint of the spring. In various embodiments, second spring 814 and third spring 816 may comprise two separate springs.

In various embodiments, a safety locking mechanism may be coupled to the uplock system. A safety blocking mechanism may prevent the uplock system from unlocking in the event of inverted flight of an aircraft or in the event of negative gravitational forces which could cause the landing gear roller to move in the positive y-direction which may consequently rotate the hook in the clockwise direction, thus beginning the unlocking process as described herein. A safety blocking mechanism may prevent the uplock system from unlocking, regardless of any movement of the landing gear roller.

In various embodiments, with reference to FIG. 9A, uplock system 10 is illustrated in a locked position and coupled to safety blocking mechanism 902, in accordance with various embodiments. In various embodiments, safety blocking mechanism 902 may be configured to prevent uplock system 10 from unlocking. In various embodiments, safety blocking mechanism 902 may include a lever 916 coupled to a rod 914 via pin 920. In various embodiments, pin 920 may comprise pin, bolt, or the like. In various embodiments, rod 914 may comprise a mechanical linkage between lever 916 and tab 924 of door 912. In various embodiments, lever 916 may be configured to rotate about pivot 918. In various embodiments, lever 916 may be coupled to center body 14 at pivot 918 via a pin or the like. In various embodiments, lever 916 may be coupled to a housing 230 (see FIG. 2) at pivot 918 via a pin or the like. In various embodiments, door 912 may comprise a landing gear bay door. In various embodiments, door 912 may be configured to rotate about pivot 922. In various embodiments, lever 916 may be configured to prevent follower 16 from rotating in the counter-clockwise direction when door 912 is in the closed position as illustrated in FIG. 9A.

Figure 9B:
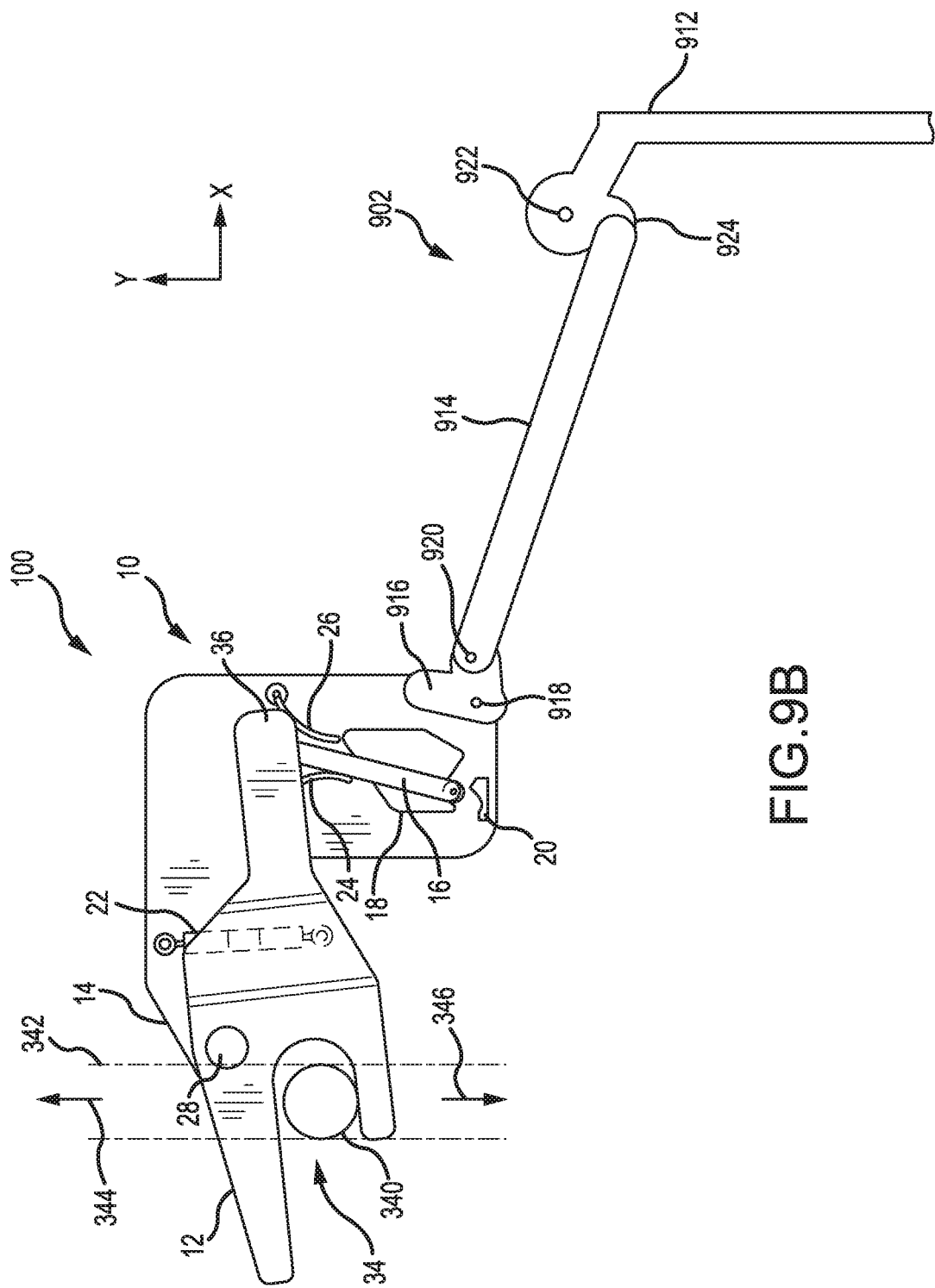
FIG. 9B illustrates an uplock system coupled to a safety blocking mechanism with the door open, in accordance with various embodiments.

With reference to FIG. 9B, lever 916 may be configured to allow follower 16 to rotate in the counter-clockwise direction when door 912 is in the open position as illustrated in FIG. 9B, in accordance with various embodiments. Rod 914 may rotate lever 916 in response to door 912 rotating from a closed position to an open position which may rotate lever 916 and thus allow follower 16 to rotate and allow uplock system 10 to begin the unlocking process, as described herein.

Figure 10A:
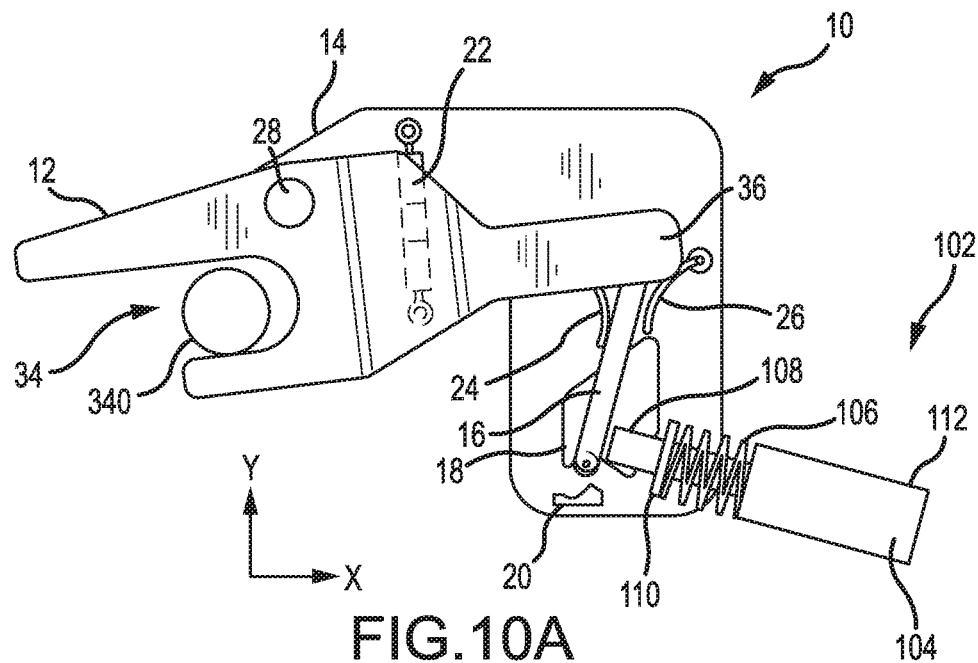
FIG. 10A illustrates an uplock system coupled to a safety blocking mechanism with the actuator in a de-energized state, in accordance with various embodiments.

In various embodiments, with reference to FIG. 10A, uplock system 10 is illustrated in a locked position and coupled to safety blocking mechanism 102, in accordance with various embodiments. In various embodiments, safety blocking mechanism 102 may be configured to prevent uplock system 10 from unlocking. In various embodiments, safety blocking mechanism 102 may include a solenoid 104. In various embodiments, solenoid 104 may comprise a spring loaded solenoid comprising a rod 108 and a fourth spring 106. However, solenoid 104 may comprise any type of suitable solenoid. In various embodiments, fourth spring 106 may be located between actuator body 112 and flange 110. FIG. 10A illustrates solenoid 104 in a de-energized state or position. Fourth spring 106 may force rod 108 to extend from solenoid 104 in response to the de-energized state. Rod 108 may prevent uplock system from beginning the unlocking process in response to the de-energized state. In various embodiments, the bias of fourth spring 106 may be greater than the bias of second biasing member 24.

Figure 10B:
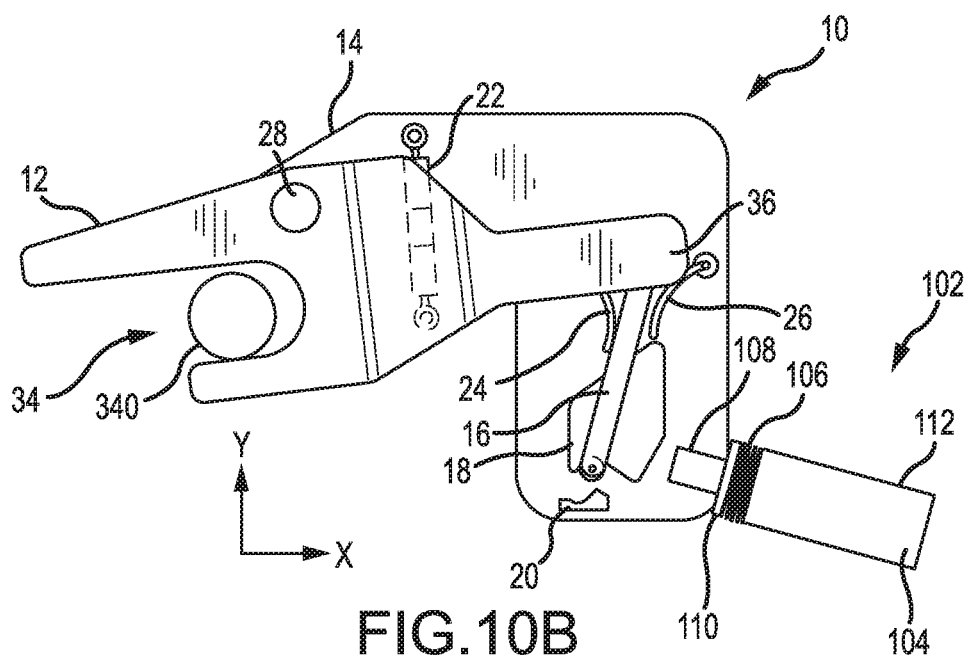
FIG. 10B illustrates an uplock system coupled to a safety blocking mechanism with the actuator in an energized state, in accordance with various embodiments.

With reference to FIG. 10B, rod 108 may be configured to allow follower 16 to rotate in the counter-clockwise direction when solenoid 104 is in the energized state or position, as illustrated in FIG. 10B, in accordance with various embodiments. Rod 108 may be at least partially retracted into solenoid 104, thus compressing fourth spring 106, in response to the energized state. Thus, safety blocking mechanism 102 may be configured to allow uplock system 10 to begin the unlocking process in response to the energized state.

In various embodiments, each component of uplock system 10 may comprise any metallic material such as, for example, aluminum alloy, steel alloy (e.g., stainless steel alloys), and/or titanium alloy.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of operating an uplocking system comprising:
- contacting with a latchable member a first surface of an opening of a hook biased in a first rotational direction relative to a body;
- rotating the hook in a second rotational direction with the contacting;
- moving the hook out of a first position relative to the body;
- rotating the hook in the first rotational direction after release of the contacting with the latchable member;
- moving the hook into a second position relative to the body, the first position and the second position being stable when the hook is biased in the first rotational direction without contact being made against the first surface; and
- retaining the latchable member with a second surface of the hook when the hook is in the second position.

2. The method of claim 1, wherein the hook is retained in the second position via a following member engaged with a cam.

\* \* \* \* \*